J. F. Hamilton.
St. Engine Valve.

No. 1864. Reissued. Feb. 7. 1865

Witnesses;
James J. Johnston
M. McBurney

Inventor;
Joseph F. Hamilton

UNITED STATES PATENT OFFICE.

JOSEPH F. HAMILTON, OF PITTSBURG, PENNSYLVANIA.

IMPROVED ARRANGEMENT OF VALVES FOR STEAM-ENGINES.

Specification forming part of Letters Patent No. 29,271, dated July 24, 1860; Reissue No. 1,864, dated February 7, 1865.

*To all whom it may concern:*

Be it known that I, JOSEPH F. HAMILTON, of Pittsburg, in the county of Allegheny and State of Pennsylvania, have invented a new and useful Improvement in Steam-Engines for Pumps, Hammers, &c.; and I do hereby declare that the following is a full and exact description thereof, reference being had to the accompanying drawings, and to the letters of reference marked thereon.

The nature of my invention consists in the use of a stopper or regulating-valve placed in one of the receiving-ports of the cylinder of the engine, arranged and operated, as herein described, for the purpose of regulating the admission of steam into one end of the cylinder to obtain the desired power for lifting and operating the plunger of a pump, or for any other purpose which requires less steam in one end of the cylinder than in the other end.

To enable others skilled in the art of constructing engines to make and use my invention, I will proceed to describe its construction and operation.

Figure 1:
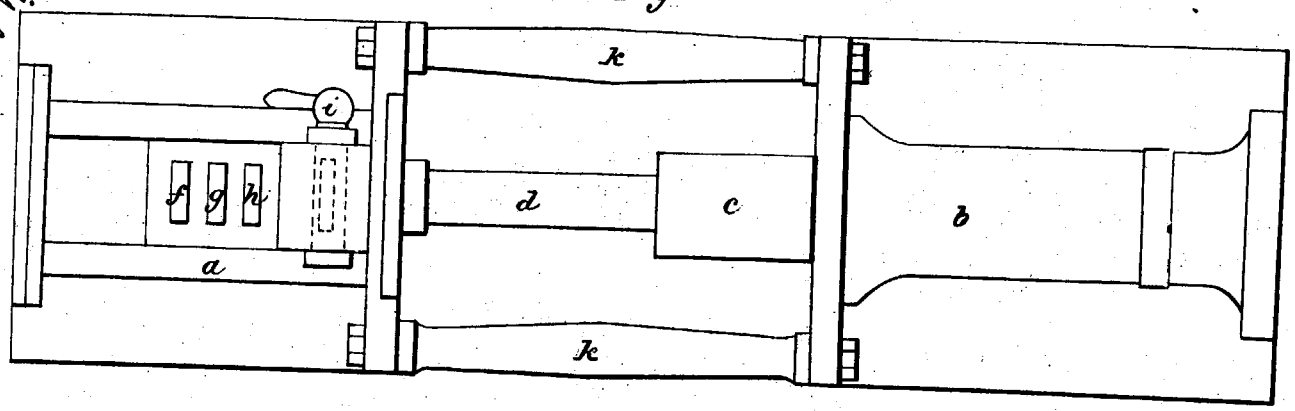
Figure 2:
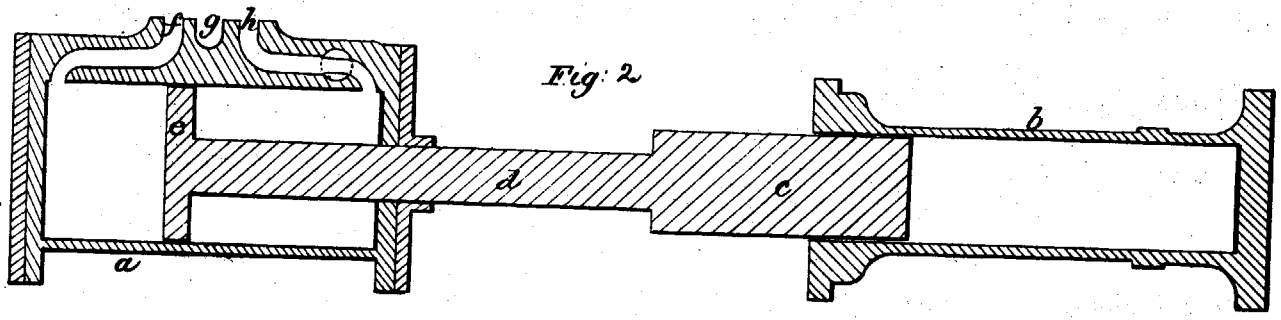

In the accompanying drawings, Figure 1 represents a top view of a steam cylinder and its connection with a pump. Fig. 2 represents a cut or sectional view of steam-cylinder and the pump.

The steam-cylinder is constructed in the usual manner and furnished with all that appertains to an ordinary steam-engine; but in addition thereto I place a stopper or regulating-valve in one of the steam-ports, as represented in the accompanying drawings at the point marked *i*.

In the drawings, *a* represents the steam-cylinder. *e* and *d* represent its piston. *f* and *h* represent the steam-ports of the cylinder, and *g* represents the exhaust-opening. *i* represents the stopper or regulating-valve. *b* represents the body of an ordinary force-pump. *c* represents its plunger, which is connected to the piston of the steam-cylinder. *k* represents columns used for connecting the engine and pump together.

The operation of my improvement is as follows: Having the engine and pump constructed substantially as herein described, I supply the engine with steam in the usual manner. I then adjust the valve *i* so as to admit steam enough to one end of the cylinder to lift the piston and its attachments into the desired position.

The action of the engine as connected with a pump is as follows: The steam which enters the port *f* will force the piston *e* and *d* toward the pump, thereby forcing the plunger into it, and the steam which enters the port *h* and passes through the valve-opening *i* will raise the piston *e* and *d* and plunger *c* to the desired position.

Having thus described the nature, construction, and operation of my improvement, what I claim as of my invention is—

The use of the valve *i*, placed in one of the receiving-ports of steam-engines, as herein described, and for the purpose set forth.

JOS. F. HAMILTON.

Witnesses:

JAMES J. JOHNSTON,
ALEXANDER HAYS.